(No Model.) 3 Sheets—Sheet 3.

J. BRAY.
RAILROAD BRAKE.

No. 595,013. Patented Dec. 7, 1897.

WITNESSES
C. E. Hunt.
George A. Byrne.

INVENTOR
John Bray
by John Wedderburn
Attorney

UNITED STATES PATENT OFFICE.

JOHN BRAY, OF BOSTON, MASSACHUSETTS.

RAILROAD-BRAKE.

SPECIFICATION forming part of Letters Patent No. 595,013, dated December 7, 1897.

Application filed November 20, 1896. Serial No. 612,833. (No model.)

*To all whom it may concern:*

Be it known that I, JOHN BRAY, a subject of the Queen of Great Britain, residing at Boston, in the county of Suffolk and State of Massachusetts, have invented certain new and useful Improvements in Railroad-Brakes; and I do hereby declare the following to be a full, clear, and exact description of the invention, such as will enable others skilled in the art to which it appertains to make and use the same.

This invention relates to improvements in brakes, and has more particular relation to combined rail and wheel brakes for railway-cars.

The invention consists of certain novel constructions, combinations, and arrangements of parts, all of which will be hereinafter more particularly set forth and claimed.

Figure 1:
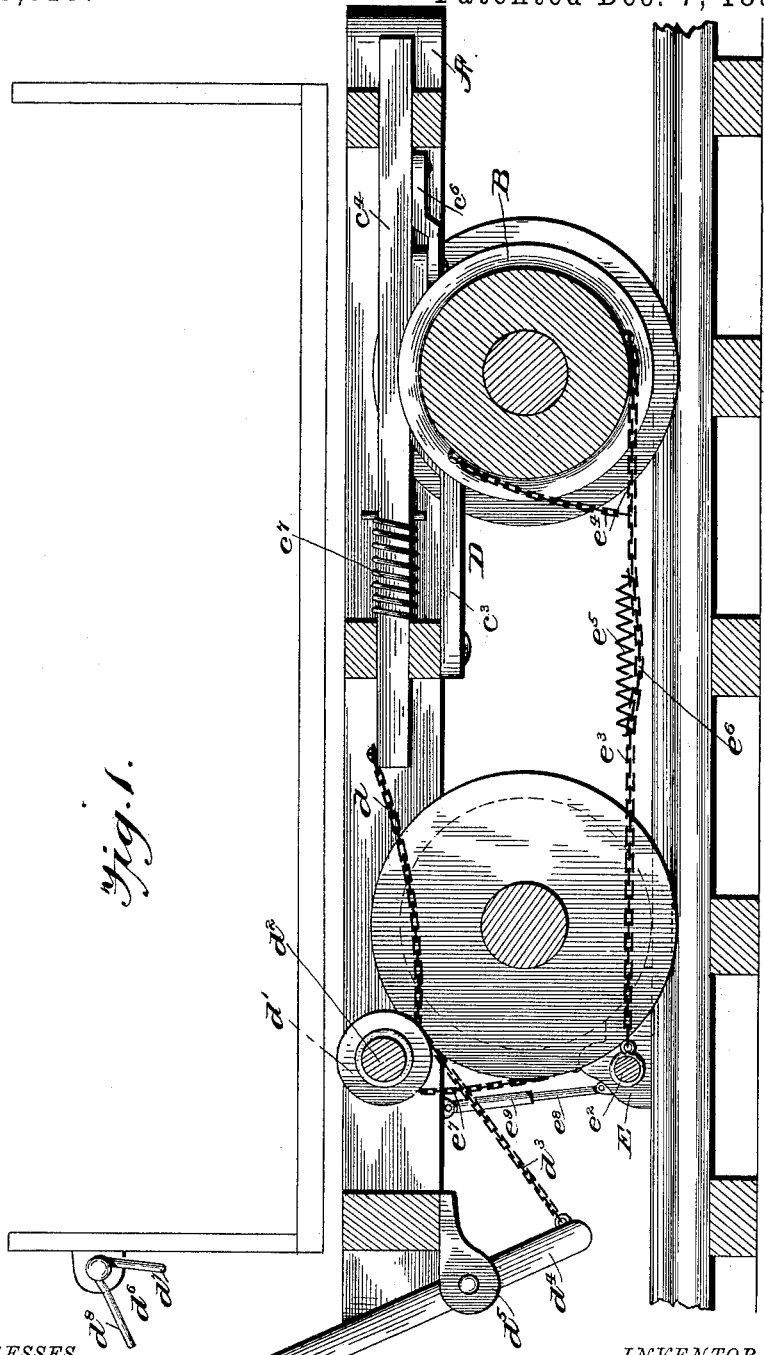
Figure 2:
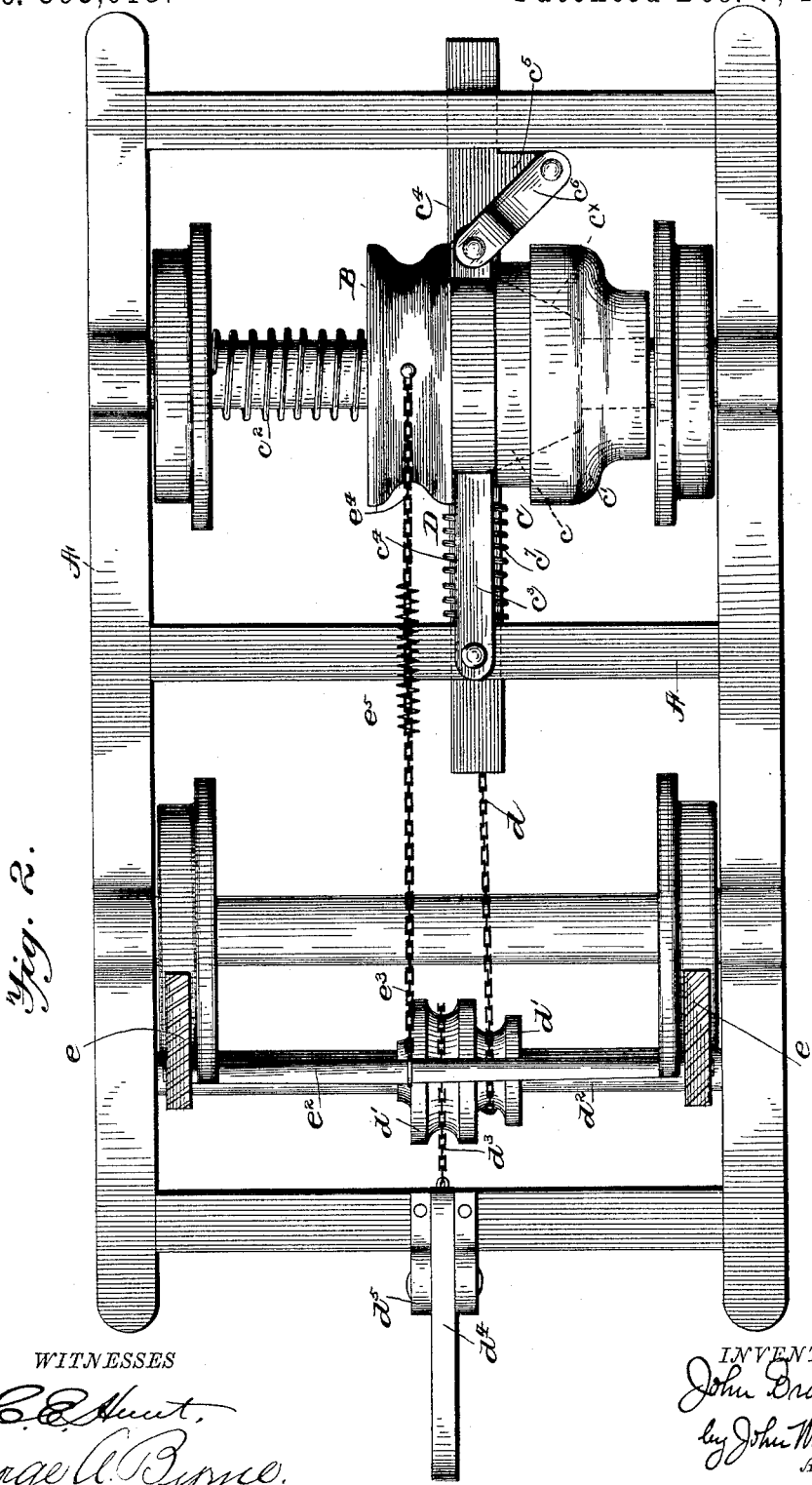
Figure 3:
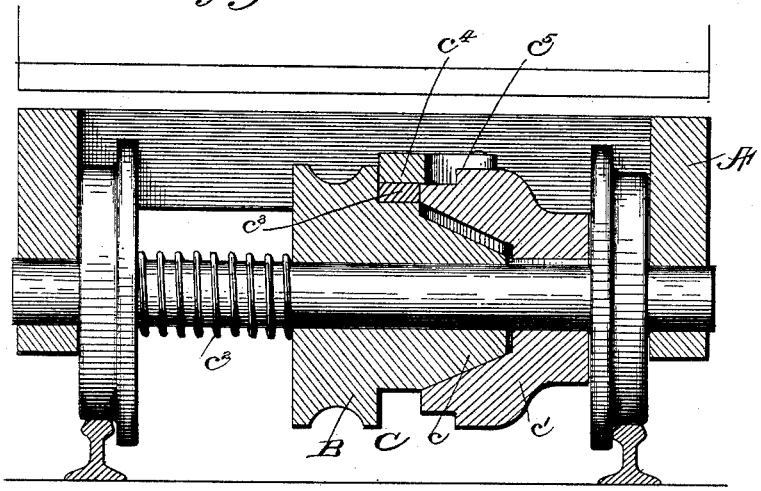
Figure 4:
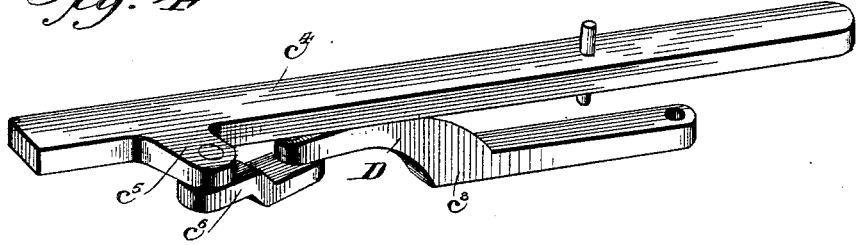
Figure 5:
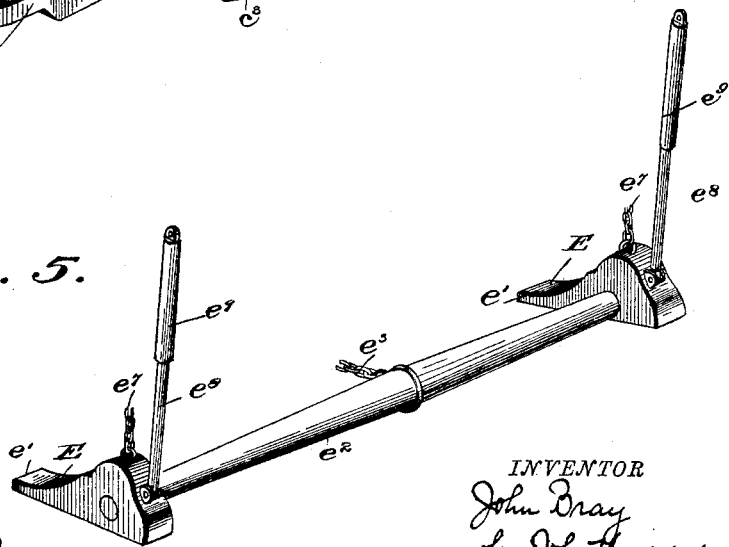

In the accompanying drawings, forming a part of this specification, Figure 1 represents a central vertical section through a car provided with my invention. Fig. 2 represents a bottom plan view of the same with the clutch in its inoperative position. Fig. 3 represents a transverse vertical section through the car upon the line of the rear axle. Fig. 4 represents an enlarged detail perspective view of the clutch-operating mechanism. Fig. 5 represents an enlarged detail perspective view of the brake-shoes, their supporting-bar, and guide-rod.

A in the drawings represents the frame of the truck; B, the winding-drum, mounted upon one of the axles; C, the clutch mechanism between said drum and axle; D, the clutch-operating device, and E E the brake-shoes.

The car and truck may be of any desired construction. The winding-drum B is loosely mounted upon one of the axles and is provided with a ribbed conical clutch-block $c$, forming one member of the clutch C. The other member of said clutch comprises a block $c'$, rigidly mounted upon the axle carrying the drum B and provided with a conical grooved socket $c^\times$, into which the conical block $c$ is adapted to be forced, so as to cause the ribs upon said block to enter the grooves in said recess and lock the two portions of the clutch firmly together. The said clutch-block $c$ is adapted to be normally forced forward into engagement with the clutch-block $c'$ by a coil-spring $c^2$, mounted upon the axle carrying the drum B and forcing said drum normally forward. The said clutch-block $c$ is held out of engagement with the clutch-block $c'$ by a lever $c^3$, pivoted at one end to the truck A and adapted to bear with its opposite end against the inner side of the drum B. A sliding bar $c^4$ of the clutch-operating mechanism D is mounted in the truck-frame A and is provided at one end with an arm $c^5$, which is connected to the lever $c^3$ by means of a pivoted link $c^6$. The said bar $c^4$ is normally forced rearward, with the arm $c^5$ abutting against a portion of the truck by a coil-spring $c^7$, that surrounds said bar and bears with its opposite ends against a portion of the truck, and a lateral pin passes through said bar.

It will be observed from the foregoing description that the tendency of the springs $c^2$ and $c^7$ is to normally permit the engaging of the clutch C and cause the rotation of the drum B. In order to hold said clutch out of engagement until it is desired to operate the drum, the said sliding bar $c^4$ is provided with a chain $d$, secured at its forward end to a winding-drum $d'$, mounted upon a lateral shaft $d^2$, journaled in the truck-frame. An auxiliary operating-chain $d^3$ is also connected to said drum $d'$ and adapted to rotate it to wind the chain $d$ thereon and thus pull the bar $c^4$ forward. The said chain $d^3$ is actuated to cause this operation by a lever $d^4$, to which it is connected and which is pivotally mounted by means of a bracket $d^5$ upon the forward portion of the truck A. The upper end of said lever $d^4$ is adapted to be held normally in toward the body of the car by a pivoted catch $d^6$, having an operating-eye $d^7$, adapted to fit over the upper end of said lever, and a handle $d^8$, by means of which said eye is disengaged or elevated off the upper end of said lever. The brake-shoes E E are each formed with a flat underroughened surface $e$, adapted to engage the rail, and a curved segmental portion $e'$, adapted to wedge under the car-wheels. The said brake-shoes are connected, so as to operate simultaneously, by a cross-bar $e^2$. This cross-bar $e^2$ is connected to the drum B by a single chain $e^3$ and a loopchain $e^4$, connected thereto and having its opposite ends secured upon diametrically opposite sides of the winding-drum B. The said chain $e^3$ is provided with a coil-spring $e^5$, so connected to said chain as to normally leave a slack portion $e^6$ therein. By means of this peculiar construction all sudden shock upon said chain $e^3$ is absorbed by the spring $e^5$, and the brake is applied without any jerking or jolting. At the same time that this spring $e^5$ acts to absorb all sudden shock, it is not of sufficient tension to prevent the chain $e^3$ ultimately assuming a position whereby the slack $e^6$ is taken up and the brake-shoes positively operated. Said brake-shoes are normally supported a slight distance above the rails and in front of the car-wheels by chains $e^7$, connected to said shoes, respectively, and to the opposite ends of the shaft $d^2$. When the operating-lever $d^4$ is secured in the proper position to hold the clutch C upon the said brake-shoes, it occupies a raised position; but when said lever $d^4$ is released by operating the pivoted catch $d^6$ the shaft $d^2$ is rotated by the rearward movement of the sliding bar $c^4$, thus permitting the chain $e^7$ to unwind and lower the brake-shoes onto the rails. When said brake-shoes engage the rails, they are instantly jammed between said rails and the car-wheels, and thus lock the wheels firmly and cause them to slide. At the same time the wheels of the axle upon which the winding-drum is mounted are also locked, as the tightening of the chain $e^3$ stops the rotation of said drum B and thus locks the axle carrying said drum against any movement. The said brake-shoes E E are guided vertically, so as to cause them to engage the rails in the proper position by telescope rods $e^8$ and $e^9$, mounted on said brake-shoes and truck-frame, respectively.

It will be observed from the foregoing description that the clutch C is normally disengaged and the brake-shoes E E raised out of contact with either the rails or the car-wheels by means of the lever $d^4$. When it is desired to release the braking-shoes in the case of an emergency and thus clog all the wheels of the car, the said pivoted catch $d$ is operated by means of its operating-handle $d^8$, thus releasing said lever $d^4$ and permitting the clutch C to engage. Immediately upon its engagement the drum B is rotated, winding the chain $e^4$ thereon and pulling the brake-shoes E E firmly under the car-wheels and between the same and the rails. The greater the forward motion of the car the greater the force with which the brake-shoes are jammed under the wheels. It will also be observed that the release of the lever $d^4$ and the operating of the clutch C are simultaneous with the lowering of the brake-shoes by their supporting-chains.

By means of my improved braking mechanism I secure a double braking action, as the car-wheels clog and drag as well as the under-roughened sides of the brake-shoes engaging the rails.

I do not care to limit the application of my improved brake to railway-cars, as the same may be applied to ordinary street or tramway cars, as well as to the engine or locomotive, if so desired. In some instances it is desirable to apply my invention to a whole train of cars and operate the brakes from a suitable releasing-lever mounted upon the engine or locomotive. In this latter case a train moving at a great speed can be stopped in a very short space, as all of its wheels may be instantly locked by simply releasing the operating-lever and thus cause the train to slide over the rails with great friction.

Having thus described my invention, what I claim as new, and desire to secure by Letters Patent, is—

1. In a car-brake, the combination with a winding-drum loosely mounted upon one of the car-axles, a clutch also mounted on said axle and adapted to engage said drum, a sliding bar mounted in the frame, a lever having one end pivotally connected to the frame and engaging said drum to move it back and disengage it from the clutch, a link pivotally connecting the free end of the lever and the sliding bar, whereby the movements of the latter are imparted to said lever, brake-shoes, and means connecting said brake-shoes and the drum, whereby the former is caused to engage the wheels upon the rotation of the latter, substantially as described.

2. In a car-brake, the combination with a winding-drum loosely mounted upon one of the car-axles, of a clutch also mounted on said axle and adapted to be engaged by said drum, a sliding spring-pressed bar mounted in the frame, means connecting said bar to the drum for moving the latter, a shaft journaled in the truck-frame and carrying a winding-drum, a chain connecting said latter drum and the sliding bar, a lever pivoted on the frame, and a chain connecting said lever and the winding-drum for rotating the latter, substantially as described.

In testimony whereof I have signed this specification in the presence of two subscribing witnesses.

JOHN BRAY.

Witnesses:
JAMES J. BRAY,
JAMES J. CURTIN.